(12) United States Patent
Kawamura

(10) Patent No.: US 6,204,962 B1
(45) Date of Patent: Mar. 20, 2001

(54) CONFOCAL MICROSCOPE

(75) Inventor: Ichiro Kawamura, Fussa (JP)

(73) Assignee: Tokyo Seimitsu Co., Ltd., Mitaka (JP)

( * ) Notice: Subject to any disclaimer, the term of this patent is extended or adjusted under 35 U.S.C. 154(b) by 0 days.

(21) Appl. No.: 09/395,717

(22) Filed: Sep. 14, 1999

(30) Foreign Application Priority Data

Nov. 30, 1998 (JP) .................................................. 10-340399

(51) Int. Cl.[7] .................................................. G02B 21/06
(52) U.S. Cl. .................. 359/368; 359/369; 359/372; 359/385; 359/388; 359/389; 359/390
(58) Field of Search .................. 359/368, 369, 359/372, 385, 388, 389, 390

(56) References Cited

FOREIGN PATENT DOCUMENTS

| | | |
|---|---|---|
| 4-350818 | 12/1992 | (JP) . |
| 5-232370 | 9/1993 | (JP) . |
| 6-051206 | 2/1994 | (JP) . |
| 7-174962 | 7/1995 | (JP) . |
| 8-043717 | 2/1996 | (JP) . |
| 8-178623 | 7/1996 | (JP) . |
| 8-220418 | 8/1996 | (JP) . |
| 9-325277 | 12/1997 | (JP) . |

Primary Examiner—Mohammad Y. Sikder
(74) Attorney, Agent, or Firm—Christie, Parker & Hale, LLP

(57) ABSTRACT

A confocal microscope is provided that can perform automatic focussing.

A beam splitter (9) is additionally disposed along an optical path of light split from reflected light from the surface of an object of a confocal microscope, whereby when light is focussed on the surface of a light detector (7), a difference between a quantity of light detected by a second light detector (11) and a quantity of light detected by a third light detector (13) is constructed so as to become a predetermined quantity, while when light is not focussed on the surface of the light detector (7), the difference between the quantity of light detected by the second light detector and the quantity of light detected by the third light detector is a quantity of light that is different from the predetermined quantity, and the object is automatically controlled such that the difference in quantity of light between the light detectors becomes the predetermined quantity.

7 Claims, 8 Drawing Sheets

CONFOCAL MICROSCOPE

BACKGROUND OF THE INVENTION

1. Field of the Invention

The present invention relates to a confocal microscope having a focal point detecting function and, more particularly, to a scanning confocal microscope for observing the surface of an object such as, especially, a semiconductor wafer, a photomask, and a semiconductor integrated device for a liquid crystal display.

2. Description of the Related Art

FIG. 9 is a drawing showing the construction of a conventional confocal microscope. In the figure, reference numeral 91 denotes a point light source, 92 a beam splitter, 93 an objective lens, 95 a stage on which an object is placed or to be placed, 96 a diaphragm for allowing the passage of only a part of light split by the beam splitter that converges on or in the vicinity of a focal point of the light so split, and 97 a light detector.

In operation, irradiated light from the point light source 91 passes through the beam splitter 92 and is focussed on the surface of the object 94 by the objective lens 93, and a part of light reflected from the surface of the object is split by the beam splitter 92 so as to pass through the diaphragm 96, and light that has passed through the diaphragm 96 is focussed on a detecting portion of the light detector 97. The surface of the object 94 is observed by moving the point light source 91 so as to scan the entire surface of the object 94 and repeating the aforementioned procedure.

In order for light from the point light source 91 to be focussed on the object 94, the stage 95 on which the object 94 is placed needs to be moved by hand so as to adjust the position of the object 94.

In the above prior art, if there are irregularities on the surface of the stage 95 on which the object 94 is placed, or if there are irregularities on the surface of the object, or if the surface of the stage or object is warped, every time such is found, the position of the stage 95 has to be manually adjusted, this making the operation of a confocal microscope complicated and troublesome.

SUMMARY OF THE INVENTION

The present invention was made in view of the problem inherent in the prior art, and an object thereof is to provide a confocal microscope that can automatically focus light from a point light source on the surface of an object.

In order to attain the above object, the present invention provides a confocal microscope comprising a light detector for detecting reflected light from an object, a beam splitter for splitting light from the object into two directions, and a light quantity difference detecting means for detecting a difference in the quantity of light split by the beam splitter into two directions, wherein the light quantity difference detecting means detects a predetermined quantity of light as a difference in quantity of light when reflected light from the object is focussed on the surface of the light detector while, when reflected light from the object is not focussed on the surface of the light detector, it detects a value different from the predetermined quantity as a difference in quantity of light, and wherein the position of the object is controlled such that an output from the light quantity difference detecting means becomes the predetermined quantity.

The light quantity difference detecting means is provided with a diaphragm and another light detector for detecting the quantity of light that has passed through the diaphragm for each of the two directions, and it is preferable that a difference between the quantity of light detected by the diaphragm and the detector for one of the two directions and that detected by the diaphragm and the detector for the other direction becomes the aforementioned difference in quantity of light.

To be more specific, provided in accordance with a first embodiment of the present invention, a confocal microscope comprising a second beam splitter is provided along an optical path between a first beam splitter and a first light detector which already exist, a third beam splitter provided along an optical path split by the second beam splitter, a second light detector for detecting the quantity of light that has been split by the third beam splitter and has passed through the second diaphragm, a third light detector for detecting light that has passed through the third beam splitter and then passed the third diaphragm, and a comparator for comparing the quantity of light detected by the second light detector with that detected by the third light detector. The layout relationship between the second beam splitter, the third beam splitter, the second light detector and the third light detector is such that a difference between the quantity of light detected by the second light detector and that detected by the third light detector becomes a predetermined quantity when light is focussed on the surface of the first light detector, while when light is not focussed on the surface of the first light detector, the layout relationship is such that a difference between the quantity of light detected by the second light detector and that detected by the third light detector becomes a quantity of light different from the predetermined quantity. The position of an object is automatically controlled such that an output from a comparator becomes the predetermined quantity.

With this construction, light from the point light source is automatically focussed on the object whether or not the stage is warped or there are irregularities on the surfaces of the stage and the object, and therefore this makes the operation of the confocal microscope markedly simple.

Preferably, the predetermined quantity is zero, but it may be a finite offset quantity.

According to a second embodiment of the present invention, a fourth beam splitter is provided along an optical path between the first beam splitter and the third beam splitter, and beam splitters and light detectors having constructions identical to those used in the first embodiment may be provided for light split by the fourth beam splitter and light that has passed through it.

This construction expands a positional range within which the object can be moved along the optical axis.

According to a third embodiment of the present invention, an optical system may be inserted between the first beam splitter and the third beam splitter of the first embodiment for altering the focal point of light.

This also expands the positional range within which the object can be moved along the optical axis.

BRIEF DESCRIPTION OF THE DRAWINGS

The above object and features of the present invention will be more apparent from the following description of the preferred embodiments when read with reference to the accompanying drawings, wherein.

DESCRIPTION OF PREFERRED EMBODIMENTS

First Embodiment

Figure 1:
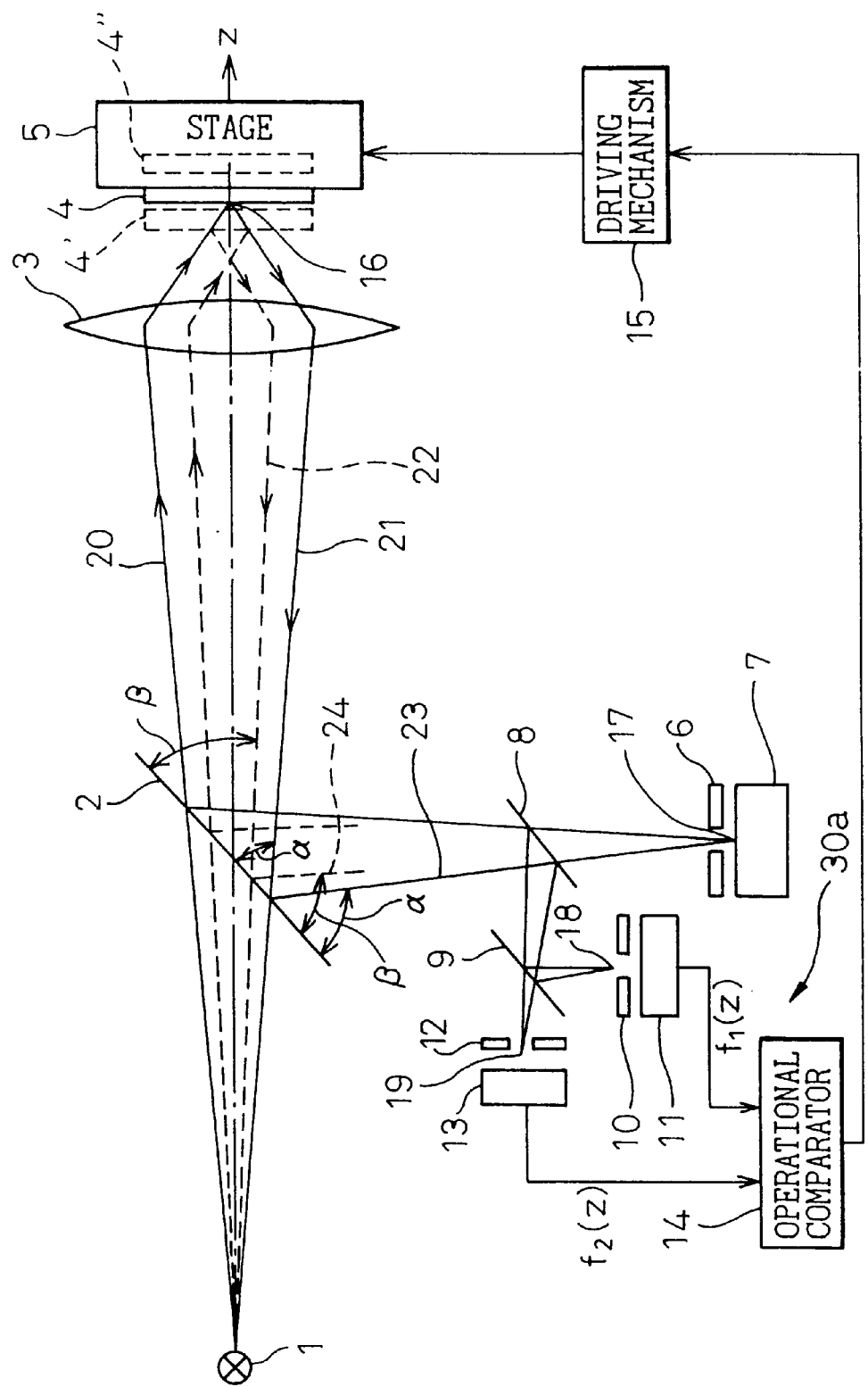
FIG. 1 is a drawing showing a construction of a confocal microscope according to a first embodiment of the present invention.
Figure 9:
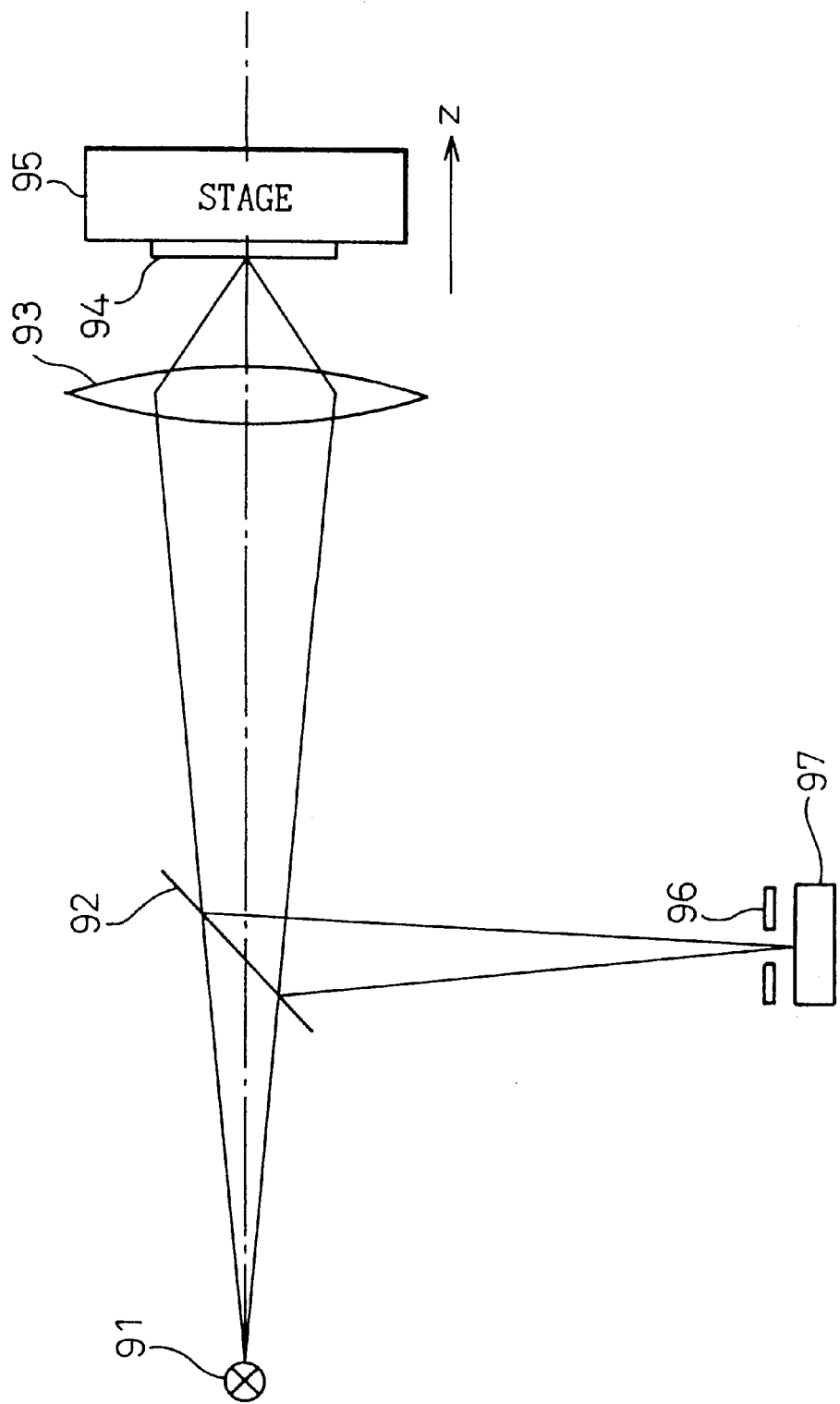
FIG. 9 is a drawing showing a construction of a conventional confocal microscope.
Figure 10:
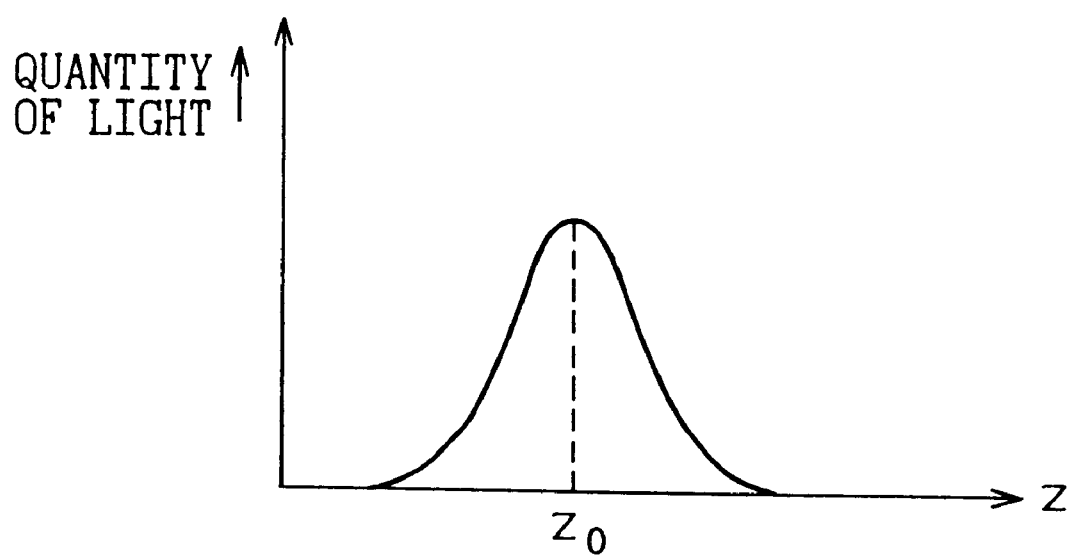
FIG. 10 is a graph showing a relationship between the quantity of light detected by the light detector and the position of the stage in an optical axis direction in FIG. 9.

FIG. 1 is a drawing showing a construction of a confocal microscope according to a first embodiment of the present invention. In the figure, reference numeral 1 denotes a point light source, 2 a first beam splitter, 3 an objective lens, 4 an object, 5 a stage on which an object is to be placed, 6 a first diaphragm for allowing the passage of a part of light split by the first beam splitter 2 that converges on or is in the vicinity of a focal point of light so split, and 7 a light detector for detecting the quantity of light passing through the first diaphragm. These are identical to those shown in FIG. 9.

In accordance with the first embodiment, there are further provided a second beam splitter 8, a third beam splitter 9, a second diaphragm 10, a second light detector 11, a third diaphragm 12, a third light detector 13, a comparator 14 and a driving mechanism 15.

The second beam splitter 8 is provided between the first beam splitter 2 and the first diaphragm 6. The third beam splitter 9 is disposed so as to split further light split by the second beam splitter 8. The second diaphragm 10 is disposed in the vicinity of a focal point of light split by the third beam splitter 9. The second light detector 11 is disposed so as to detect light passing through the second diaphragm 10.

The third diaphragm 12 is disposed in the vicinity of a focal point of light passing through the third beam splitter 9. The light detector 13 is disposed to detect the quantity of light passing through the third diaphragm 12.

The comparator 14 compares the quantity of light detected by the second light detector 11 with the quantity of light detected by the third light detector 13.

The layout relationship among the second beam splitter 8, third beam splitter 9, second diaphragm 10, second light detector 11, third diaphragm 12 and third light detector 13 is such that a difference between the quantity of light detected by the second light detector 11 and that detected by the third light detector 13 becomes a predetermined quantity when light is focussed on the first light detector 7, while when there is no light focussed on the first light detector 7, the layout relationship is such that the difference between the quantity of light detected by the second light detector 11 and that detected by the third light detector 13 becomes a quantity of light different from the predetermined quantity.

The driving mechanism 15 controls the position of the stage 5 such that an output from the comparator 14 becomes the predetermined quantity.

A light quantity difference detecting means 30a is constituted by the second diaphragm 10, second light detector 11, third diaphragm 12, third light detector 13 and comparator 14.

In operation, irradiated light from the point light source 1 passes through the beam splitter 2 and is focussed on the surface of the object 4 by the objective lens 3. A part of light reflected from the surface of the object is split by the beam splitter 2 and then passes through the diaphragm 6, and light that has passed through the diaphragm 6 is focussed on a detecting portion of the light detector 7. The surface of the object 4 is observed by moving the point light source 1 so as to scan the entire surface of the object 4 and repeating the procedure described above. The procedure followed when light from the light source 1 is focussed on the surface of the object 4 is identical to that followed in the prior art confocal microscope.

In accordance with the embodiment of the present invention, light split by the second beam splitter 8 is further split into two directions by the third beam splitter 9; light split in one of the directions being detected by the second light detector 11 via the second diaphragm 10 and light allowed to transmit the third beam splitter 9 being detected by the third light detector 13 via the third diaphragm 12. A difference between the quantity of light detected by the second light detector 11 and that detected by the third light detector 13 is calculated by the comparator 14, and the driving mechanism 15 is controlled to move the stage 5 in accordance with a difference in quantity of light so calculated out such that the quantity of light detected above becomes a predetermined quantity.

In the embodiment shown in FIG. 1, the second beam splitter 8 is disposed at a position along an optical path of light split by the first beam splitter 2, and the third beam splitter 9 is disposed at a position along an optical path of light split by the second beam splitter 8. However, instead of this construction, the second beam splitter may be disposed at any position along an optical path of light reflected from the object 4, and the third beam splitter may be disposed at a position along an optical path of light split by the second beam splitter 2 so disposed, a diaphragm and a light detector being able to be provided, respectively, for the split light from the third beam splitter and the light allowed to transmit the same light splitter.

Described below will be a specific case where the predetermined quantity is zero.

In a case where the predetermined quantity is zero, when the focal point position 17 of light that has passed through the second beam splitter 8 coincides with the detecting position of the first light detector 7, in other words, with the position of the surface of the first light detector 7, the layout relationship is such that a difference between the quantity of light detected by the second light detector 11 and that detected by the third light detector 13 is zero, while when the light is not focussed on the first light detector 7, the layout relationship is such that a difference between the quantity of light detected by the second light detector 11 and that detected by the third light detector 13 is a quantity of light other than zero.

For instance, if the surface of the object 4 is convex or that the stage 5 is convex toward the lens 3, whereby the surface of the object 4 is positioned closer to the objective lens 3 than is a focus 16 this is equivalent to a case where an object 4' exists at a location indicated by dotted lines in FIG. 1. Since the surface of the object 4' is closer to the lens than is the surface of the original normal object 4, an incident angle β at which reflected light 22 from the surface of the object 4' enters the beam splitter 2 becomes larger than an incident angle a at which reflected light 21 from the surface of the object 4 enters the beam splitter 2. Therefore, with respect to an exit angle of light split from the beam splitter 2, an exit angle β of reflected light 23 of reflected light 22 becomes larger than an exit angle a of reflected light 23 of reflected light 21. As a result of this, a focal point position 17 of light split from the beam splitter 2 is moved closer to the beam splitter 2. This also moves a focal point position 18 of light split from the third beam splitter 9 and a foal point position 19 of light that has passed through the same beam splitter closer to the beam splitter 9.

The same consideration can be given to a case where the surface of the object 4 is concave or the stage 5 is concave toward the lens 3, whereby the surface of the object 4 is located farther away from the lens 3 than the focus position 16 is, as shown by an object 4" indicated by dotted lines in FIG. 1. In this case, the focal point position 17 of light that has passed through the second beam splitter 8 is moved away from the beam splitter 8 and this also moves away from the third beam splitter 9 the focal point position 18 of light split from the beam splitter 9 and the focal point position 19 of light that has passed through the same beam splitter.

Figure 2A:
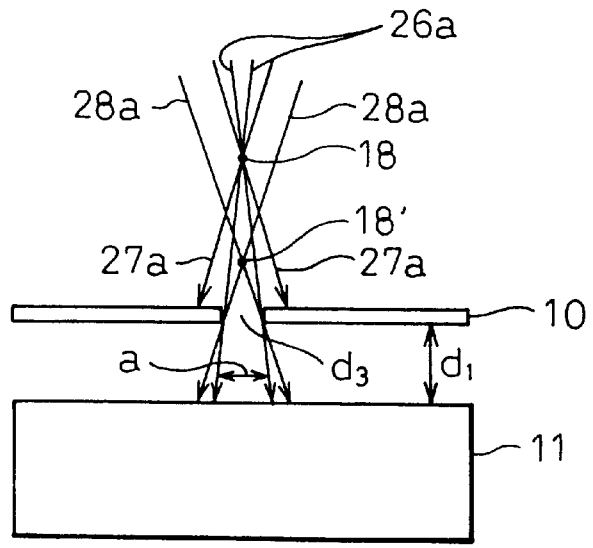
FIGS. 2A and 2B are explanatory views showing a change in quantity of light received by a light detector due to a change in position of an object in FIG. 1.
Figure 2B:
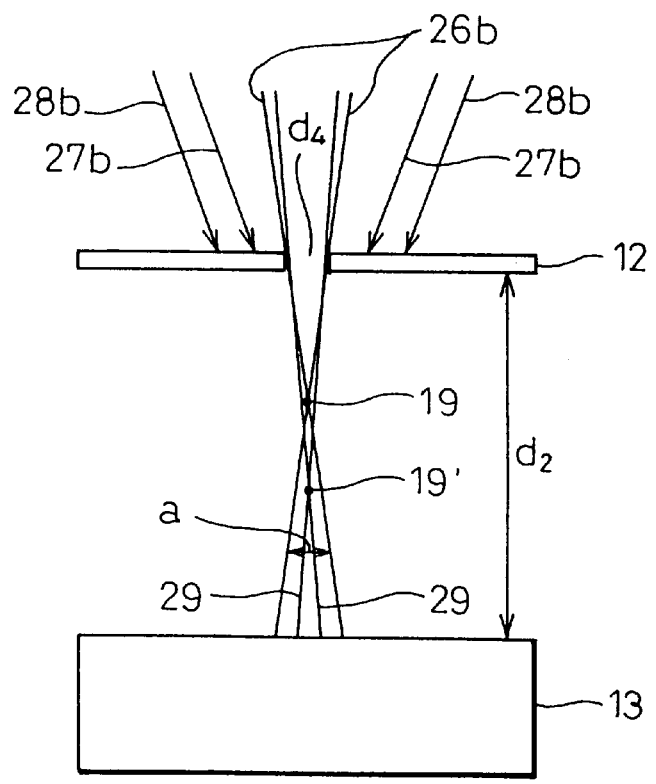

FIGS. 2A and 2B are explanatory views explaining a change in quantity of light received by the second detector 11 and the third light detector 13 when the object is moved from the position indicated by the object 4 to the position indicated by the object 4' in FIG. 1. As shown therein, a distance d2 between the third diaphragm 12 and the third light detector 13 is made larger than a distance d1 between the second diaphragm 10 and the second light detector 11. The diameters of the apertures of the diaphragms 10 and 12 are, respectively, d3 and d4. The difference between the distances d1 and d2 and the diameters d3 and d4 of the apertures are set as below. Namely, when light from the light source 1 is focussed on the surface of the object 4 with reflected light therefrom being split from the beam splitter 2 so as to be focussed on the surface of the light detector 7, as shown in FIGS. 2A and 2B, the distances d1 and d2 and the diameters d3 and d4 are set in advance such that the focal point position 18 of light split from the beam splitter 9 is located on a side opposed to the light detector 11 across the diaphragm 10 viewed as a reference and the focal point position 19 of light that has passed through the beam splitter 9 is located on the same side as the light detector 13 when the diaphragm 12 is viewed as a reference and such that the same quantity of light is received by the light detectors 11 and 13 at that time, and moreover an optical system is also disposed in advance. The quantities of light received by the light detectors are expressed, respectively, by the divergence of bundles of rays passing through the diaphragms.

When light is focussed respectively on the focal point positions 18 and 19, a bundle of rays passing through the diaphragm 10 is indicated by lines 26a, and a bundle of rays passing through the diaphragm 12 by lines 26b. In order for the light detectors to receive the same quantity of light in that case, the optical system is set such that the divergences of the bundles of rays 26a and 26b become the same value of a. In addition, rays 27a outside the bundle of rays incident on the diaphragm 10 are interrupted by the diaphragm 10, and rays 27b outside the bundle of rays incident on the diaphragm 12 are interrupted by the diaphragm 12.

When the object is moved from the position of the object 4 to the position of the object 4', as described above, the focal point positions 18 and 19 are moved away from the beam splitter 9 to be located at focal point positions 18' and 19'.

In FIG. 2A, when the focal point position is moved from 18 to 18', since the focal point approaches the diaphragm 10, a quantity of light interrupted by the diaphragm 10 is reduced, and as shown by lines 28 in the illustration, the entirety of the bundle of rays is allowed to pass through the diaphragm. Therefore, the quantity of light passing through the diaphragm 10 is increased when compared to the case with the focal point position 18.

Similarly, in FIG. 2B, when the focal point position is moved from 19 to 19', since the focal point is moved away from the diaphragm 12, the bundle of rays incident on the diaphragm 12 is changed from a bundle of rays 27b to a bundle of rays 28b, the quantity of light interrupted by the diaphragm 12 is increased. Consequently, as indicated by lines 29, the quantity of light passing through the diaphragm 12 is decreased when compared to the case with the focal point position 19.

Figure 3:
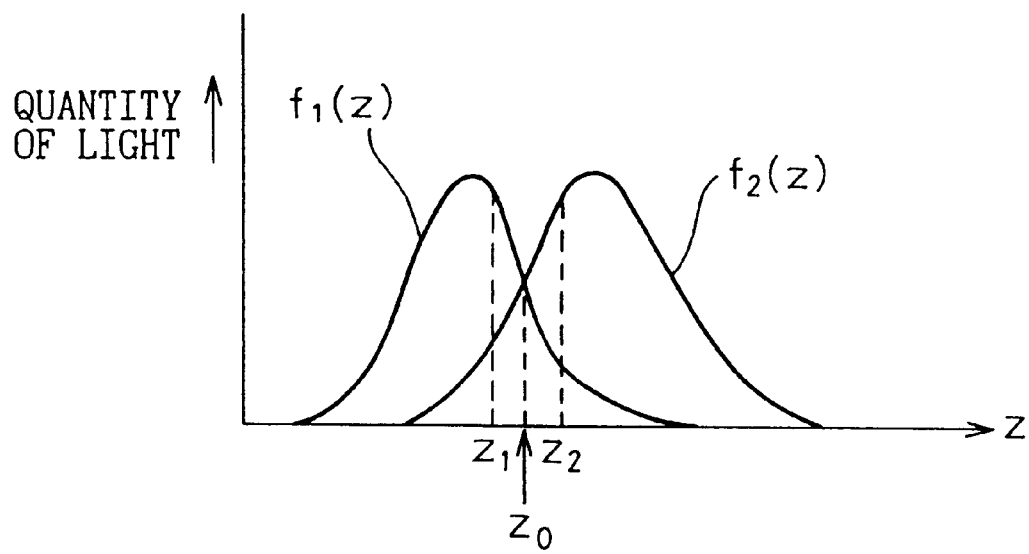
FIG. 3 is a graph showing a relationship between the quantity of light detected by the light detector and the position of a stage in an optical axis direction in FIG. 1.

FIG. 3 is a graph showing a relationship between quantities of light detected by the light detectors 11 and 13 and the position of the stage 5 in the optical axis direction. In the figure, $f_1(Z)$ is a graph showing a quantity of light detected by the light detector 11, and $f_2(Z)$ is a graph showing a quantity of light detected by the light detector 13. A position $Z_0$ where a difference in quantity of light between $f_1(Z)$ and $f_2(Z)$ becomes zero is a confocal point of the stage 5. As shown in FIGS. 2A and 2B, at a position $Z_1$ whose value is smaller than $Z_0$ (a position where the stage 5 is moved to the side of the lens 3), the quantity $f_1(Z)$ of light detected by the second light detector 11 is larger than the quantity $f_2(Z)$ of light detected by the third light detector 13. On the contrary to this, at a position $Z_2$ whose value is larger than $Z_0$ (a position where the stage 5 is moved away from the lens 3), the quantity $f_1(Z)$ of light detected by the second light detector 11 is smaller than the quantity $f_2(Z)$ of light detected by the third light detector 13.

Figure 4:
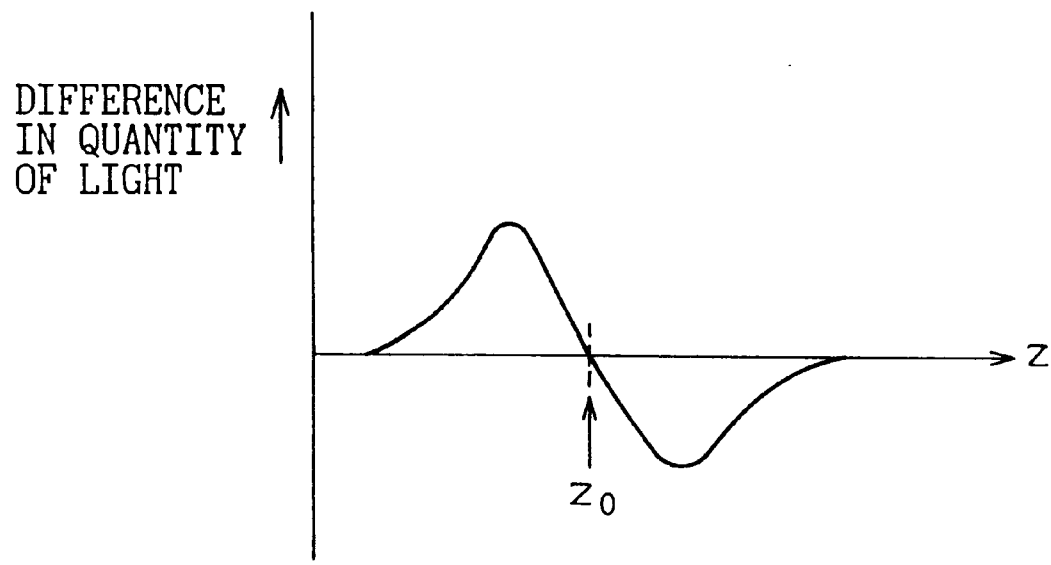
FIG. 4 is a graph showing a difference in quantity of light detected by the light detector shown in FIG. 3.

FIG. 4 is a graph showing the difference f1(Z)–f2(Z) in quantity of light detected shown in FIG. 3. As shown in the figure, the difference in quantity of light detected becomes zero at position $Z_0$, and at a position whose value is smaller than $Z_0$ the difference in quantity of light detected becomes positive, while at a position whose value is larger than $Z_0$, the difference in quantity of light detected becomes negative.

These differences in quantity of light detected are calculated by the comparator 14, and the driving mechanism 15 is moved in accordance with differences in quantity of light so calculated.

Second Embodiment

Figure 5:
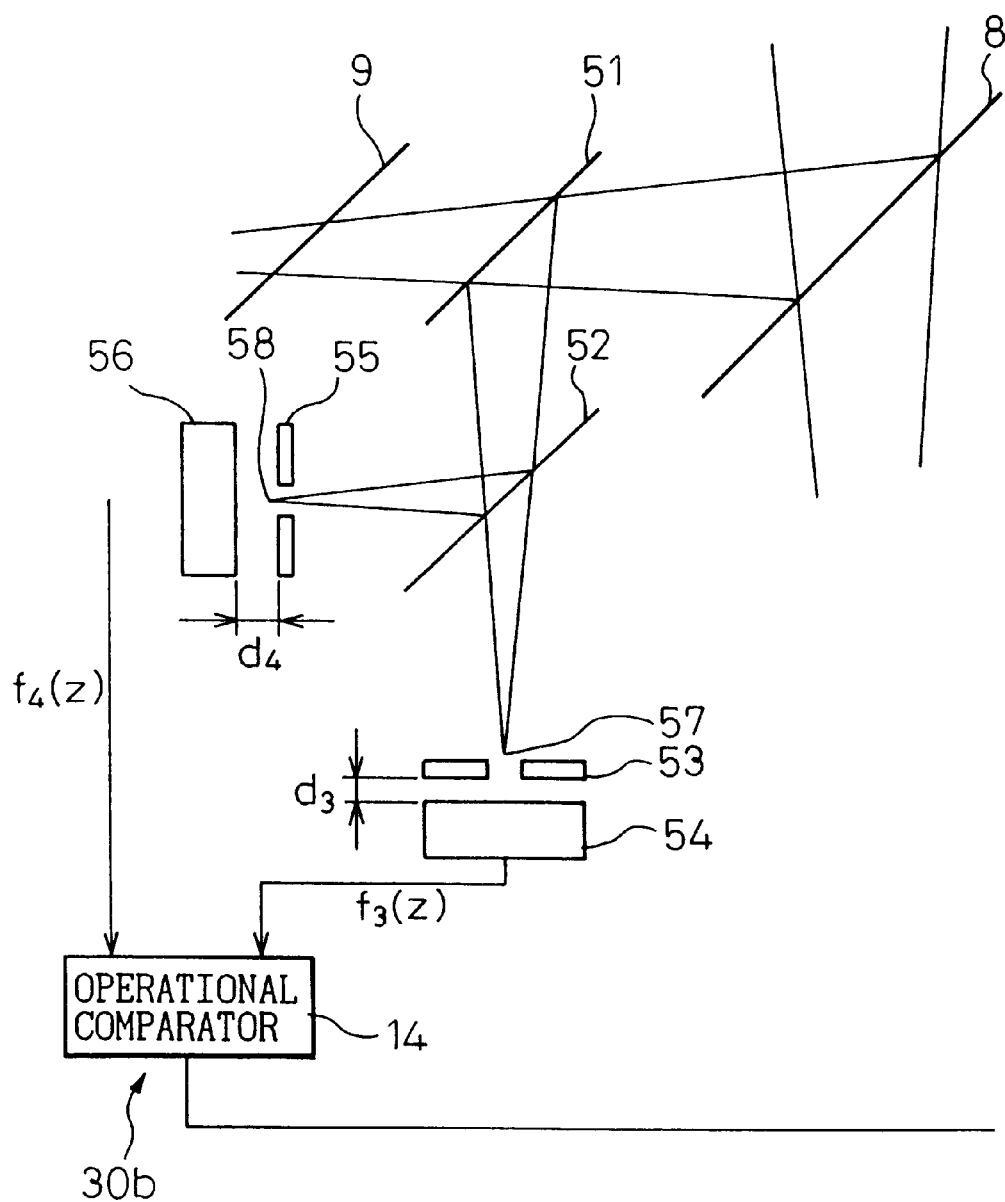
FIG. 5 is a drawing showing a construction of a part of a confocal microscope according to a second embodiment of the present invention.

FIG. 5 is a drawing showing a part of an optical system of a confocal microscope according to a second embodiment of the present invention. In the figure, reference numerals the same as those shown in FIG. 1 indicate components similar to those shown in FIG. 1. In the confocal microscope according to this embodiment, provided in addition to the construction shown in FIG. 1 are a fourth beam splitter 51, a fifth beam splitter 52, a fourth diaphragm 53, a fourth light detector 54, a fifth diaphragm 55 and a fifth light detector 56.

The fourth beam splitter 51 is provided along an optical path between the second beam splitter 8 and the third beam splitter 9. The fifth beam splitter 52 is provided along an optical path of light split by the fourth beam splitter 51.

The fourth diaphragm 53 is provided in the vicinity of a focal point position of light transmitting the fifth beam splitter 52, and the fourth light detector 54 detects a quantity of light transmitting the diaphragm 53.

The fifth diaphragm 55 is provided in the vicinity of a focal point position of light split by the fifth beam splitter, and the fifth light detector 56 detects a quantity of light passing through the diaphragm 55.

As shown in the figure, a distance d4 between the fifth diaphragm 55 and the fifth light detector 56 is made larger than a distance d3 between the fourth diaphragm 53 and the fourth light detector 54. A difference between the above distances d3 and d4 is set in the same manner as that used with respect to the distances d1 and d2 in the first embodiment, which will be described below. Namely, when light from the light source 1 is focussed on the surface of the object 4 and reflected light from the object is split by the beam splitter 2 and is focussed on the light detector 7, the distance d3 and d4 are set such that a focal point position 57 of light transmitting the beam splitter 52 is located on a side opposed to the light detector 54 across the diaphragm 53 viewed as a reference and a focal point 58 of light split by the beam splitter 52 is located on the same side as that where the light detector 56 is located with the diaphragm 55 being viewed as a reference and such that quantities of light received by the light detector 54 and the light detector 56 become identical, and other optical systems are also arranged as required in advance.

A difference between the quantity of light detected by the fourth light detector 54 and that detected by the fifth light detector 55 is also calculated by the comparator 14, and the driving mechanism is controlled in accordance with a difference so calculated in the same manner as that used in the first embodiment.

A light quantity difference detecting means 30b is constituted by the fourth diaphragm 53, the fourth light detector 54, the fifth diaphragm 55, the fifth light detector 56 and the comparator 14.

Figure 6:
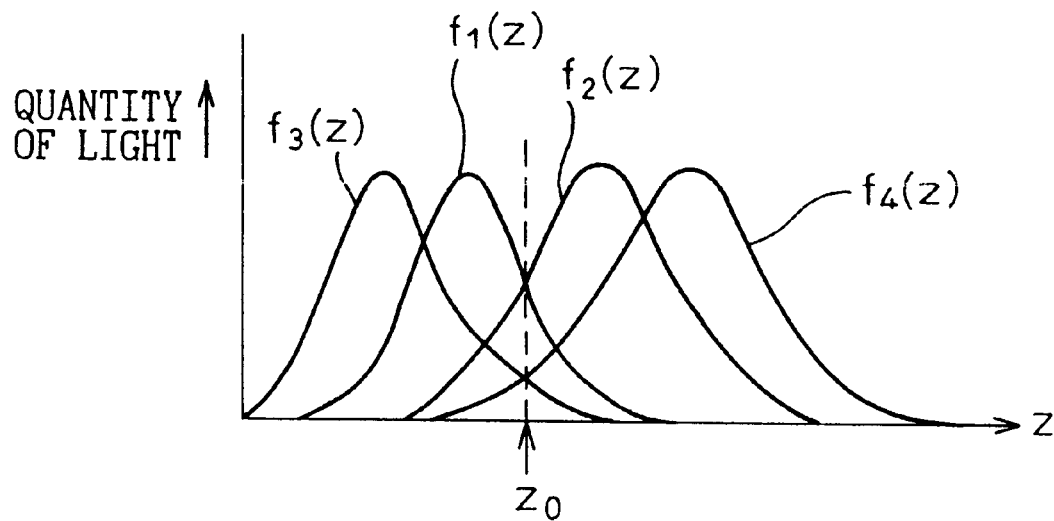
FIG. 6 is a graph showing a relationship between the quantity of light detected by the light detector and the position of the stage in an optical axis direction in FIG. 5.

FIG. 6 is a graph showing the relationship between quantities of light detected by the four light detectors of the confocal microscope shown in FIG. 5, i.e., the light detectors 11 (refer to FIG. 1), 13 (refer to FIG. 1), 54 and 55 and the position of the stage 5 along the optical axis direction. In the figure, $f_1(Z)$ is a graph showing the quantity of light detected by the light detector 11, $f_2(Z)$ a graph showing the quantity of light detected by the detector 13, $f_3(Z)$ a graph showing the quantity of light detected by the light detector 13 and $f_4(Z)$ a graph showing the quantity of light detected by the light detector 13. The fact that a position $Z_0$ where a difference in quantity of light between $f_1(Z)$ and $f_2(Z)$ becomes zero is a confocal point position for the stage 5 is the same as the first embodiment shown in FIG. 1, but in this embodiment, the position $Z_0$ is also a position where a difference in quantity of light between $f_3(Z)$ and $f_4(Z)$ becomes zero.

Figure 7:
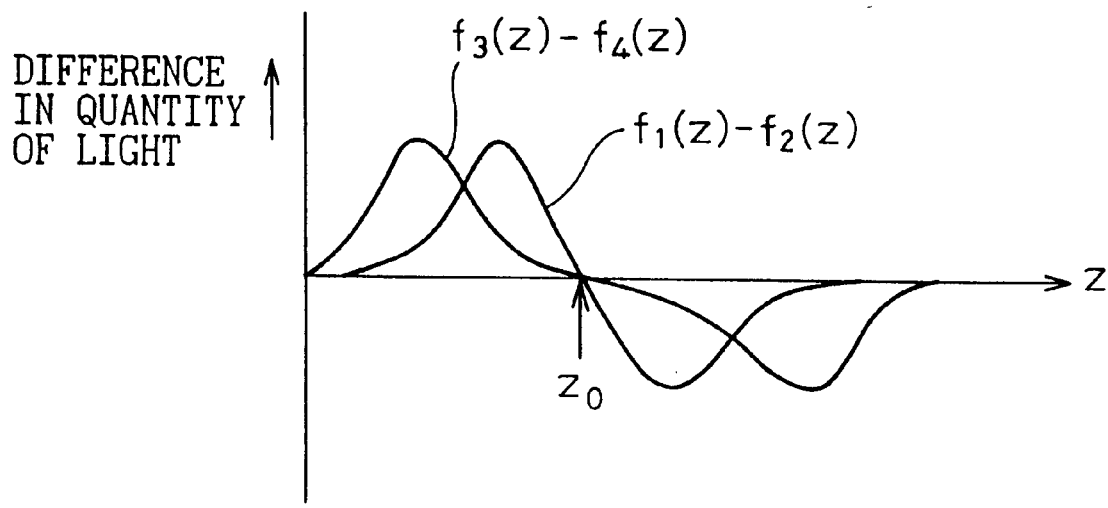
FIG. 7 a graph showing a difference in quantity of light detected by the light detector shown in FIG. 5.

FIG. 7 is a graph showing the differences f1(z)–f2(Z) and f3(Z)–f4(Z) in quantity of light detected shown in FIG. 6. As shown in the figure, the differences in quantity of light detected become zero at a position Z0, and the differences become positive at a position whose value is smaller than Z0, while they become negative at a position whose value is larger than Z0, and this is identical to the case shown in FIG. 4. However, in this embodiment, as shown in FIG. 5, the additional provision of the fourth and fifth beam splitters expands the detection range of the stage 5 in the Z direction wider than the range provided by the first embodiment. This is shown in FIGS. 6 and 7 showing that the range in the Z direction corresponding to the changes in quantities of light f3(Z) and f4(Z) is wider than the range in the Z direction corresponding to the changes in quantities of light f1(Z) and f2(Z). Thus, the reason why the range for Z is expanded is because the fourth beam splitter 51 and the fifth beam splitter 54 are further provided between the first beam splitter 2 and the third beam splitter 9 so as to expand the width of detection of light.

In FIG. 5, one beam splitter 51 is provided between the second beam splitter 8 and the third beam splitter 9, but in FIG. 1, one or more beam splitters may be provided at optional positions along the optical path between the first beam splitter 2 and the third beam splitter 9, and the beam splitters for obtaining split light and passed through light, respectively, from the respective beam splitters may be stopped by the respective diaphragms for detection by the respective light detectors. In this case, the position of the diaphragms and the focal point positions of split light and passed through light may be designed such that they fall within the relationship shown either in FIG. 1 or in FIG. 5.

Third Embodiment

Figure 8:
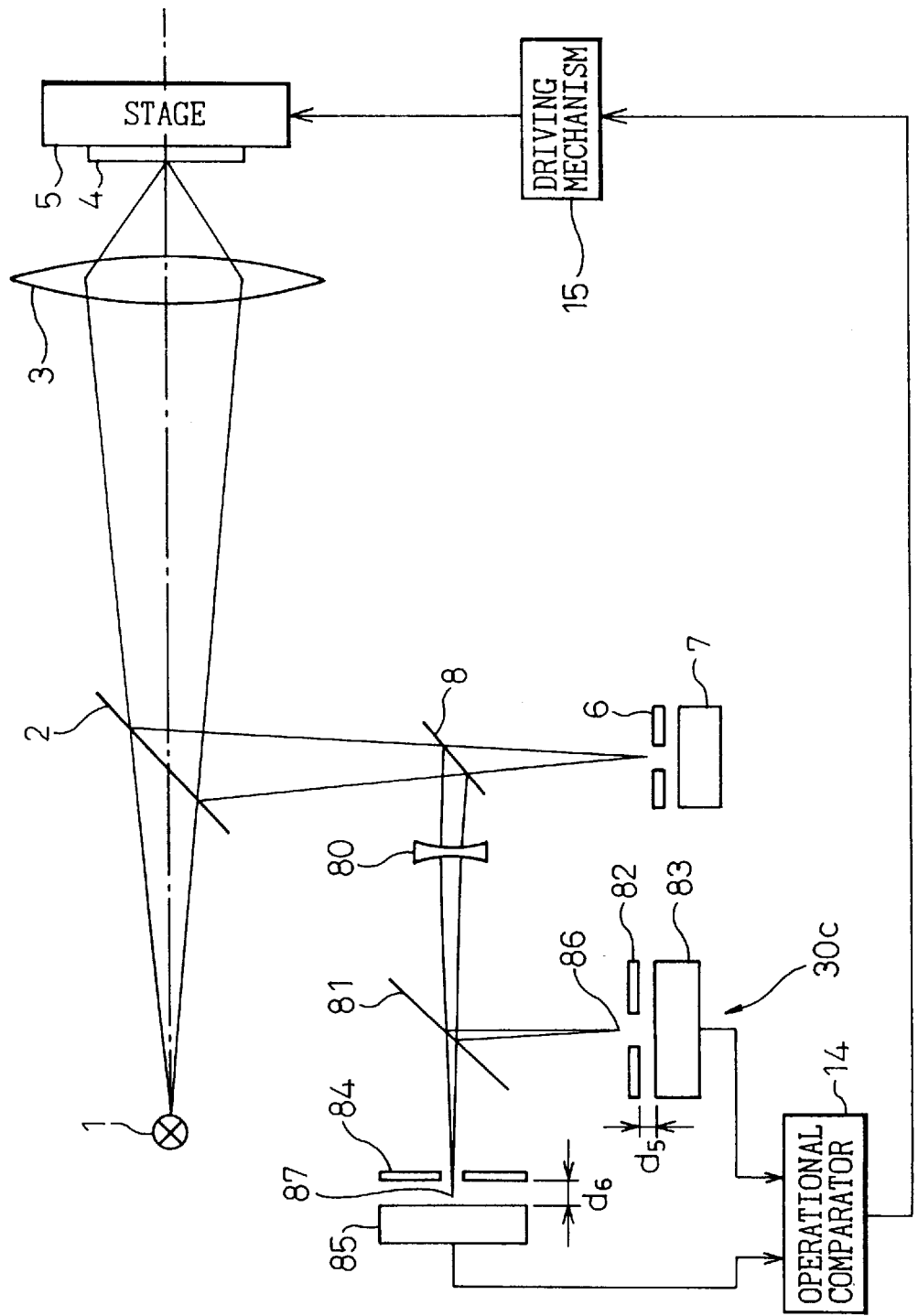
FIG. 8 is a drawing showing a construction of a confocal microscope according to a third embodiment of the present invention.

FIG. 8 is a drawing showing a construction of a confocal microscope according to a third embodiment of the present invention. In the figure, reference numerals the same as those in FIG. 1 denote components similar to those shown FIG. 1. Provided in addition to the point light source 1, first beam splitter 2, objective lens 3, object 4, stage 5, first diaphragm 6, first light detector 7, second light beam splitter 8, comparator 14 and driving mechanism 15 shown in FIG. 1 are a concave lens 80 as an optical system for moving a focal point position of light split by the second beam splitter 8 farther away from the light source along an optical path of the split light, a sixth beam splitter 81, a sixth diaphragm 82, a sixth light detector 83, a seventh diaphragm 84 and a seventh light detector 85.

The sixth beam splitter 81 is provided along an optical path of light that has passed through the concave lens 81. The sixth diaphragm 82 is provided in the vicinity of a focal point position 86 of light split by the sixth beam splitter 81, and the sixth light detector 83 detects light that has passed through the sixth light detector 83.

The seventh diaphragm 84 is provided in the vicinity of a focal point position 87 of light that has passed through the sixth beam splitter 81, the seventh light detector 85 detects light that has passed through the diaphragm 84.

A light quantity difference detecting means 30c is constituted by the sixth diaphragm 83, seventh diaphragm 84, seventh light detector 85 and comparator 14.

As shown in the figure, a distance d6 between the sixth diaphragm 84 and the seventh light detector 85 is made larger than a distance d5 between the sixth diaphragm 82 and the sixth light detector 83. A difference between the distances d5 and d6 is set in the same manner as that used in setting the distances d1 and d2 in the first embodiment, as will be described below. In other words, when light from the light source is focussed on the surface of the object 4 with reflected light therefrom being split by the beam splitter 2 and focussed on the surface of the light detector 7, the distances d5 and d6 are set in advance such that the focal point 86 of light split by the beam splitter 81 is located on a side opposed to the light detector 83 across the diaphragm 82 when the diaphragm is viewed as a reference, and the focal point position 87 of light that has passed through the beam splitter 81 is located on the same side as the light detector 85 when the diaphragm 84 is viewed as a reference and such that quantities of light received then by the light detectors 83 and 85, respectively, coincide with each other, and other optical systems are arranged in advance as required.

With this construction, since the focal point position of reflected light from the object 4 can be located farther away from the surface of the object 4 than that shown in FIG. 1, the position of the stage 5 can be finely adjusted in the Z direction over a wide range.

In FIG. 8, although the concave lens is disposed along the optical path of light split from the second beam splitter 8, even when the concave lens 8 is disposed between the first beam splitter 2 and the second beam splitter 8, the same function and effect as obtained through the construction shown in FIG. 8 can be obtained.

As is clear from the description heretofore, the present invention is advantageous in that in the confocal microscope, light from the point light source can automatically be focussed on the surface of the object.

What is claimed is:

1. A confocal microscope for observing a surface of an object by focussing irradiated light from a point light source on the surface of said object with an objective lens, splitting a part of reflected light from said object with a first beam splitter so as to make it pass through a first diaphragm, and focusing light that has passed through said first diaphragm on a first light detector, said confocal microscope comprising, a second beam splitter provided between said first beam splitter and said first diaphragm, a third beam splitter for splitting further light split with said second beam splitter, a second diaphragm disposed in a vicinity of a focal point position of light split with said third beam splitter, a second light detector for detecting light that has passed through said second diaphragm a third diaphragm disposed in a vicinity of a focal point position of light that has passed through said third beam splitter, a third light detector for detecting light that has passed through said third diaphragm, a comparator for comparing a quantity of light detected by said second light detector and a quantity of light detected by said third light detector, and a driving mechanism for controlling the position of said object in accordance with an output from said comparator, wherein the layout relationship among said second beam splitter, said third beam splitter, said second diaphragm, said second light detector, said third diaphragm, and said third light detector is such that a difference between a quantity of light detected by said second light detector and a quantity of light detected by said third light detector becomes a predetermined quantity when light is focussed on the surface on said first light detector, while when light is not focussed on the surface of said first light detector, the layout relationship is such that the difference between the quantity of light detected by said second light detector and the quantity of light detected by third light detector is a quantity of light that is different from said predetermined quantity, and said driving mechanism is adapted to control the position of said object such that an output from said comparator becomes said predetermined quantity.

2. A confocal microscope as set forth in claim 1, wherein said predetermined quantity is zero.

3. A confocal microscope as set forth in claim 1, wherein said predetermined quantity is a finite offset quantity.

4. A confocal microscope as set forth in claim 1, further comprising a fourth beam splitter along an optical path between said first beam splitter and said third beam splitter, said confocal microscope further comprising, a fifth beam splitter for splitting further light split with said fourth beam splitter, a fourth diaphragm disposed in the vicinity of a focal point position of light split with said fifth beam splitter, a fourth light detector for detecting light that has passed through said fourth diaphragm, a fifth diaphragm disposed in the vicinity of a focal point position of light that has passed through the said fifth beam splitter, and a fifth light detector for detecting light that has passed through said fifth diaphragm, wherein said comparator for comparing a quantity of light detected by said fourth light detector and a quantity of light detected by said fifth light detector, wherein the layout relationship among said fourth beam splitter, said fifth beam splitter, said fourth diaphragm, said fourth light detector, said fifth diaphragm and said fifth light detector is such that a quantity of light detected by said fourth light detector and a quantity of light detected by said fifth light detector becomes a second predetermined quantity when light is focussed on the surface of said first light detector, while when light is not focussed on the surface of said first light detector the layout relationship is such that the quantity of light detected by said fourth light detector and the quantity of light detected by said fifth light detector is a quantity of light that is different from said second predetermined quantity, and wherein said driving mechanism is adapted to control the position of said object such that an output from said comparator becomes said second predetermined quantity.

5. A confocal microscope as set forth in claim 4, wherein said second predetermined quantity is zero.

6. A confocal microscope as set forth in claim 4, said second predetermined quantity is a finite offset quantity.

7. A confocal microscope as set forth in claim 1, wherein an optical system for changing a focal point position of light is provided between said first beam splitter and said third beam splitter.

* * * * *